United States Patent Office 3,141,865
Patented July 21, 1964

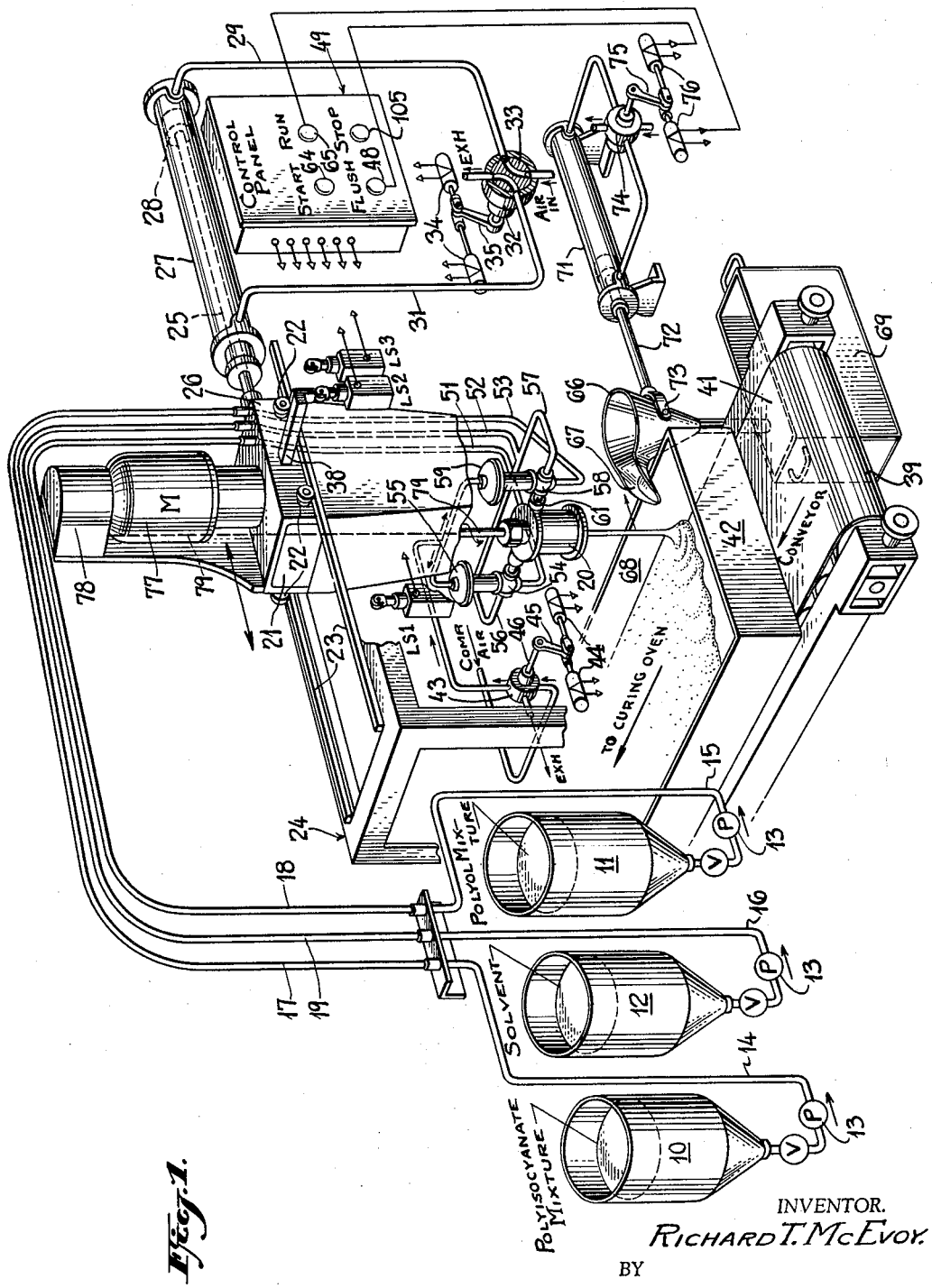

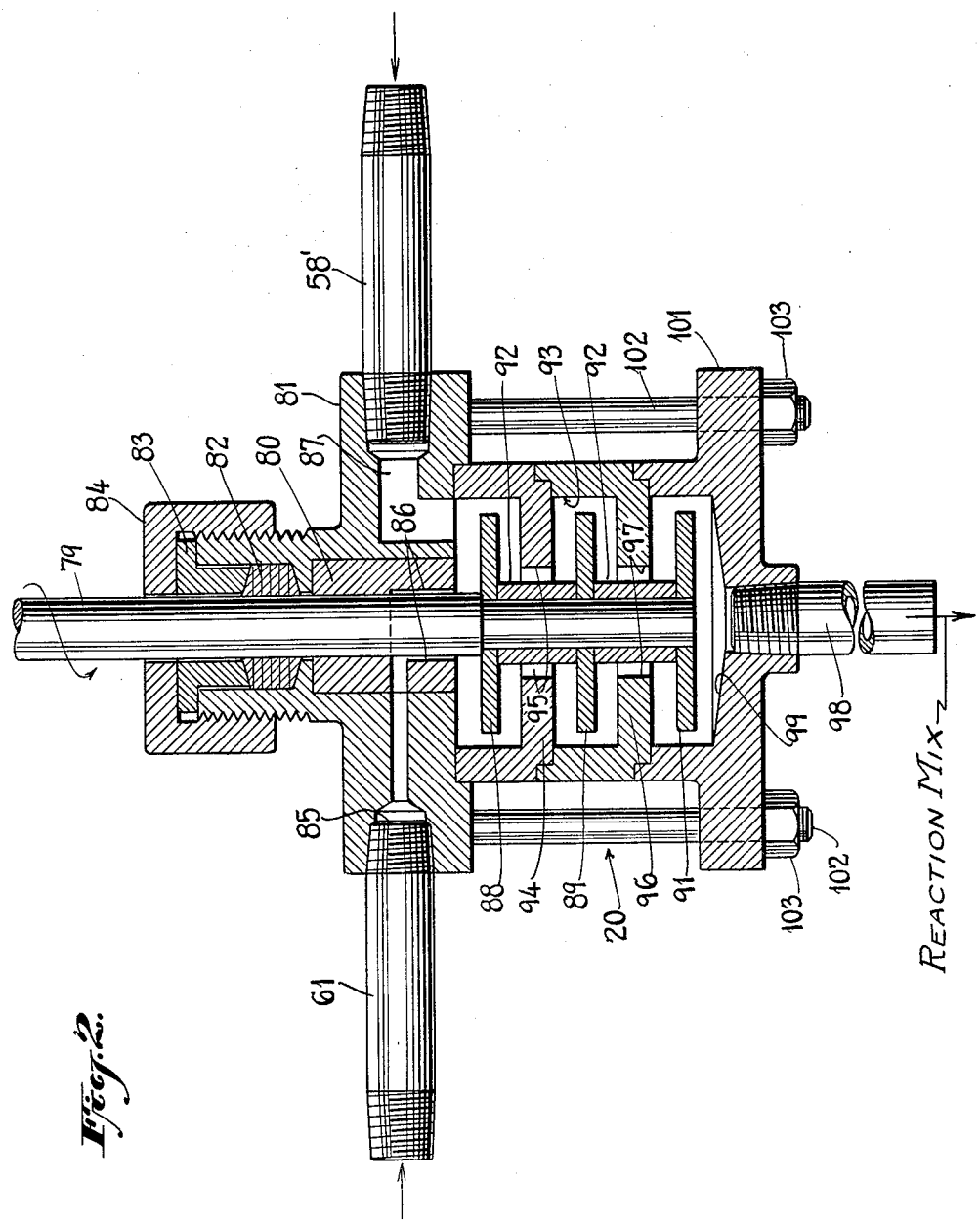

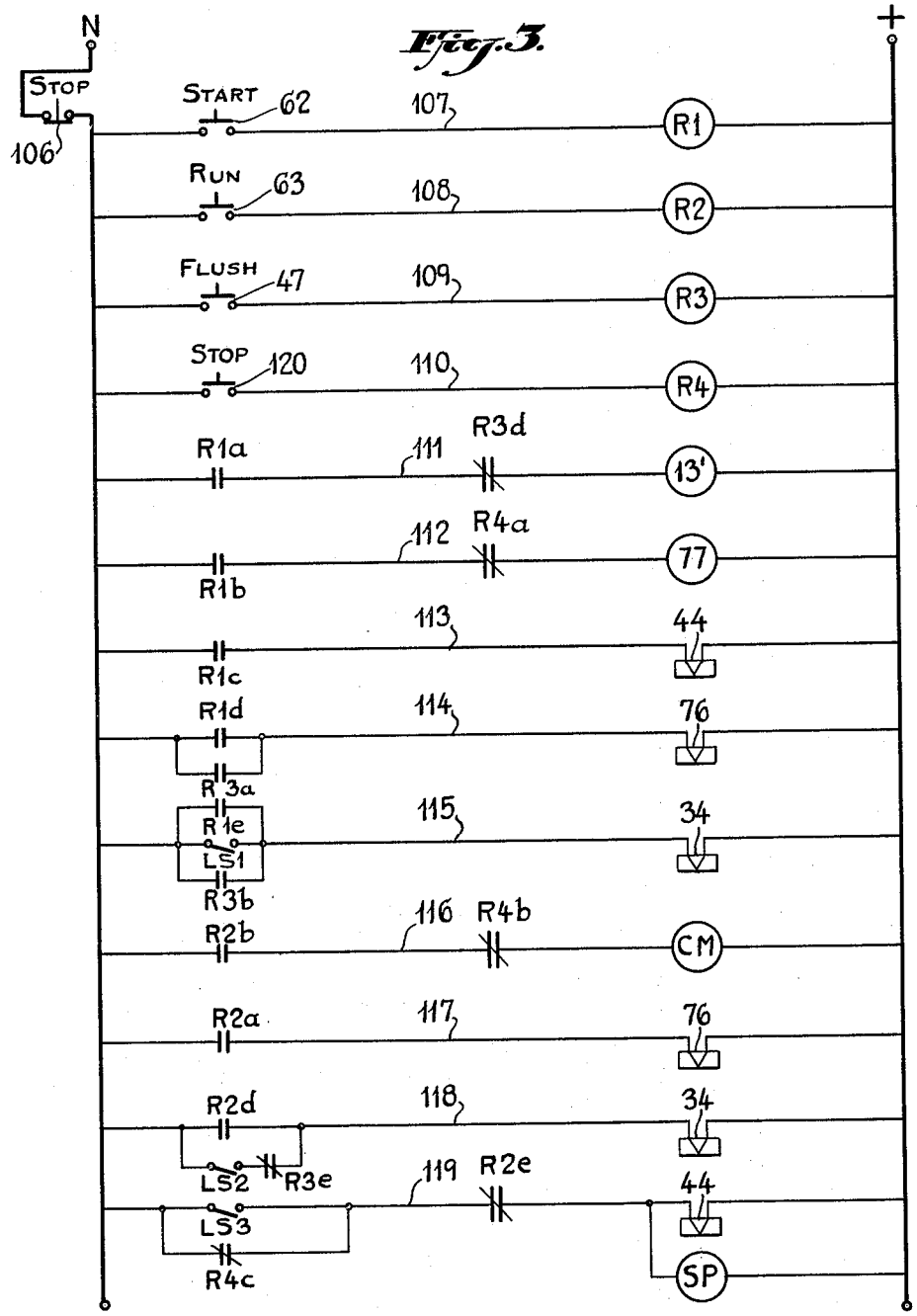

---

3,141,865
MIXING PROCESS FOR PRODUCING POLY-URETHANE PLASTICS
Richard T. McEvoy, Lake View, N.Y., assignor to Allied Chemical Corporation, a corporation of New York
Filed June 13, 1957, Ser. No. 665,398
5 Claims. (Cl. 260—75)

This invention relates to processes for the manufacture of polyurethane plastics, including polyurethane foams.

The manufacture of polyurethane plastics requires that the reactants and usually the other constituents incorporated in the reaction mix, such as the catalyst, emulsifying agent, colorants, plasticizers, etc., shall be uniformly and intimately mixed. This presents certain problems among which may be mentioned:

At least one of the reactants frequently is so viscous that it is difficult to effect a continuous flow thereof into admixture with the other reactants and constituents of the mix to produce a uniform intimate, reaction mixture in which the reactants and added constituents are adequately dispersed.

The reaction mass becomes increasingly viscous and resinous as the reaction proceeds with consequent difficulty in obtaining a uniformly and intimately mixed reaction mixture for discharge into the molds when forming molded products, or discharge onto a suitable surface when forming sheets or films.

The allowable mixing time may be very short, e.g., not more than one second, for some polyurethane foam formulations, thus increasing the difficulty in obtaining within this short time uniformly and intimately mixed reaction mixtures.

When an interruption takes place in the mixing equipment for even a few seconds, say because of the necessity of changing the molds into which the reaction mixture is fed or for other reasons, the reaction mixture frequently forms a rubbery, viscous mass which renders the mixing chamber inoperative. The formation of such rubbery masses in the mixing chamber, when flow of the reactants therethrough has been momentarily interrupted, has been an important cause of the difficulties encountered in existing equipment employed for the continuous formation of reaction mixtures which are continuously discharged to produce the desired polyurethane plastics in solid form. This tendency of residual material reacting in the mixer to form rubbery masses has resulted in frequent shut-downs of the equipment for cleansing or repair. Moreover in some existing equipment resinous or rubbery matter tends to accumulate on bearings and various other surfaces and parts necessitating frequent disassembling and cleaning of the mixing equipment.

Mixing devices heretofore used have been unduly complicated and expensive involving, for example, the use of injection pumps operating at pressures of from 300 lbs. to 15,000 lbs. per square inch, which are employed to inject some or all of the components of the formulation into a mixing chamber at an elevated pressure below that at which the injection pumps operate. Such injection takes place at high frequencies of the order of from 50 to 10,000 injections per minute.

In accordance with the process of the present invention, separate streams of formulation materials are introduced continuously and separately into an enclosed mixing chamber where they are mixed and subjected to planar shearing forces varying in intensity in approximately sinusoidal manner with respect to flow of the mixture through the mixing chamber, thus resulting in a reaction mix at the discharge end of the mixing chamber which mix is of exceptionally good uniformity and in which the constituents are adequately dispersed.

At least one stream of formulation material comprises a catalyst and may also contain the polyol component of the formulation. At least one other stream of formulation material contains the polyisocyanate component of the formulation either as such (e.g. the "single shot" method hereinafter described) or as a reaction product or partial reaction product with the polyol component of the formulation (the "prepolymer" method described hereinafter).

Preferably, upon interruption for any reason, of the continuous feed of the reactants through the mixing chamber, the mixing chamber is flushed with a suitable solvent, such as acetone, methyl ethyl ketone or trichlor-ethylene. This flushing procedure maintains the mixing chamber clean at all times and prevents clogging thereof due to the formation of resinous or rubbery matter which would otherwise tend to accumulate therein. Hence as a practical matter, the equipment can operate indefinitely without the necessity of changing the mixing chamber or disassembling or cleaning the mixing chamber.

The mixing process of the present invention can be carried out in a mixing chamber having inlet ports communicating with supplies of the reactants and also with a solvent medium for flushing the mixing chamber, all controlled to continuously supply the reactants and other constituents to the mixing chamber and upon interruption of such supply to pump solvent through the mixing chamber under the control of the operator to flush the mixing chamber. The mixing chamber is provided with at least two inter-connected sections and has a rotor shaft extending axially through these sections and mounted for rotation in a bearing. The inlet ports for the first section are spaced from the bearing for the rotor shaft so that the reactants flow toward the mixing chamber in a direction away from this bearing.

Disc-like rotor elements extend radially in spaced relation from the rotor shaft and cooperate with spaced baffles which extend from the walls of the mixing chamber towards the rotor shaft. There is thus provided, a sinusoidal path of flow of substantially equal depth or thickness throughout its extent through the mixing chamber. For example, the polyisocyanate formulation mixture entering in the axial region of the mixing chamber flows outwardly toward the periphery. Thus the polyisocyanate material flushes the inlet portion of the mixing chamber, in a direction away from the bearing for the rotor shaft, as will be explained more fully hereinafter. The polyol formulation material, which is the more reactive particularly in that it tends to polymerize, is introduced into the peripheral region of the mixing chamber where it mixes with the flowing stream of polyisocyanate. The mixture flows first towards the axial portion of the mixer, then towards the peripheral portion, then towards the axial portion, etc. In the flow of the mixture through the mixing chamber it is subjected to predominantly shearing forces created by the rapidly rotating rotor discs closely spaced relative to the baffles. These forces have a minimum value when the reaction mixture is in the axial region of the mixing chamber and increase continuously as the reaction mixture flows outwardly to the peripheral region of the chamber because the linear speed of the rotor elements increases as the radial distance increases and reaches a maximum at the outer periphery, i.e., near the inner wall of the mixing chamber, thereafter decreases to a minimum value as the reaction mixture flows back toward the axial region of the mixing chamber, etc. The intensity of the shearing force applied to each particle of the reaction mixture thus varies sinusoidally with time, i.e., it goes through periodic maximum and minimum values.

It will be understood that the intensity of the shearing force may temporarily pass through a submaximum value while the reaction mixture is in the peripheral region of the mixing chamber beyond the edges of the rotors, but for all practical purposes this may be disregarded, since it represents only a minor deviation from the generally sinusoidal intensity of the shearing forces to which the reaction mixture is subjected as it flows through the mixing chamber.

The expression "sinusoidal intensity" is used herein to define the variations in intensity of the shearing forces to which the reaction mixture is subjected, as hereinabove explained.

In the production of polyurethane plastics, a reaction is effected between a polyfunctional organic isocyanate and a polyol which may contain terminal carboxyl groups or other functional substituents in addition to terminal hydroxyl groups. A complex reaction resulting in formation of high molecular weight resinous material ensues. Chain extending and/or cross-linking reactions which are, or may be, involved result in formation of the following linkages; urethane linkages from addition reactions between hydroxyl groups and isocyanate groups; uretidinedione linkages from addition reactions between two isocyanate groups; urea linkages from addition reactions between isocyanate groups and —$NH_2$ or

groups; and amide linkages from reaction between isocyanate groups and carboxyl groups, which reaction also forms carbon dioxide gas.

In the production of polyurethane foams, the gas required to expand the foam may be, wholly or in part, carbon dioxide which is formed in situ as a product of the polyurethane-forming reactions. In some formulations for rigid foams of relatively high density, the polyol reactant contains a sufficient concentration of carboxyl groups to provide all the carbon dioxide required to expand the foam. However, most formulations for making polyurethane foams, particularly flexible and semi-rigid foams, require use of water as a reactant to provide some or all of the carbon dioxide needed to expand the foam to the required density. This water reacts with two isocyanate groups to form chain-coupling urea linkages with simultaneous evolution of carbon dioxide gas.

Polyols useful for making polyurethane plastics include a wide variety of materials. The major resin-forming reactant is usually a high molecular weight material, such as a polyalkylene glycol, or a polyester polyol prepared by copolymerizing a polycarboxylic acid, such as adipic acid, with a polyol, such as diethylene glycol, or a mixture of diethylene glycol with a triol, such as trimethylol propane. Some formulations also use low molecular weight polyols, e.g., triethylene glycol, diethanolamine, quinite, as auxiliary chain coupling agents.

Polyols suitable for making foams include (1) castor oil, (2) triols, such as glycerol, trimethylol propane, 1,2,6-hexanetriol and 1,2,4-butanetriol, (3) polyalkylene glycols prepared from ethylene, propylene or tetramethylene glycols, including polybutylene glycol, of molecular weight 3000, derived from 1,4-butylene glycol, known commercially as Teracol 30, (4) polyester diols prepared by copolymerizing a dicarboxylic acid, such as adipic, phthalic, sebacic, succinic, oxalic or sebacic acid with a glycol or polyalkylene glycol, such as ethylene, diethylene, propylene and butylene glycols, and (5) alkyd resins, such as are obtained by copolymerizing ethylene glycol with a mixture of phthalic and adipic acids.

In the production of polyurethane plastics, especially foams, the ratio of polyisocyanate to polyol may be varied, as is known. While this invention is not limited to these proportions of reactants, in general, the production of polyisocyanate to polyol used is such that the ratio of the number of isocyanate groups in the polyisocyanate to the number of hydroxyl groups in the polyol is in the range of 1.5 to 1 to 4.5 to 1, preferably from 2.1 to 1 to 2.6 to 1.

Polyisocyanates useful for making polyurethane plastics include, among many others, m- or p-phenylene diisocyanates, 4,4'-diphenylmethane diisocyanates, tetramethylene diisocyanate, 2,4- and 2,6-tolylene diisocyanates, 1-chloro phenylene-2,4-diisocyanate, 3,3'-bitolylene-4,4'-diisocyanate, methylene di-p-phenyleneisocyanate, 1,5-naphthalene diisocyanate, triisocyanates prepared by reacting 3 mols of a diisocyanate, such as m-tolylene diisocyanate, with one mol of a triol, such as castor oil, trimethylol propane, or hexanetriol-1,2,6.

In some procedures, the polyisocyanate is used in the form of a "blocked" derivative, which is unreactive under ordinary conditions but unstable under reaction conditions so that it decomposes to regenerate the polyisocyanate. Thus, one mol of m-tolylene diisocyanate may be reacted with 2 mols of phenol to form the corresponding diphenyl urethane, which will decompose under reaction conditions to regenerate the diisocyanate together with the phenol.

Catalysts used in the preparation of polyurethane plastic are usually weakly alkaline materials, such as tertiary organic amines of a non-aromatic character. Examples include N-methylmorpholine, N,N-dimethylamino-ethanol, N,N-diethylethanol-amine, N,N-dimethylcyclohexylamine, N-ethyl morpholine, and the adipic acid diester of N,N'-dimethylamino-ethanol. High molecular weight amines of low vapor pressure are ordinarily preferred because more volatile amines may impart an undesirable odor to the product. The usual amount of the catalyst may be employed; in general up to 5% of catalyst based on the polyol will give satisfactory results.

Emulsifiers used in the preparation of polyurethane plastics are usually of the non-ionic type, e.g., sorbitan monolaurate (Span 20), polyethylene glycol ricinoleate (Emulphor EL–719), polyethylene glycol monoether of dibutyl phenol, monoether of a polyethylene glycol with an alkyl phenol, blends of poly alcohol carboxylic acid esters and oil soluble sulfonates (Witco 77), poly oxy alkylene derivatives of sorbitan monolaurate (e.g., Tween 20 and Tween 80), etc. Anionic emulsifiers, such as sodium dioctyl sulfosuccinate, may also be used. In general the amount of emulsifier required does not exceed 10% based on the polyol.

Polyurethane plastics may be prepared by either of two basic procedures: the "single shot" method, or the "prepolymer" method. In the "single shot" method a formulation material including or consisting of the polyisocyanate and a formulation material including or consisting of the polyol, are separately introduced into the mixing chamber, with the polyol formulation material introduced into the periphery of the mixing chamber where it mixes with the polyisocyanate introduced into the axial region of the mixing chamber.

In the "prepolymer" procedure, the polyisocyanate and polyol are premixed and partially reacted to form a "prepolymer" which is introduced into the peripheral region of the mixing chamber while the catalyst or catalyst-containing mixture which also includes one or more of the following: water, emulsifier, colorant, plasticizer, or auxiliary cross-linking or coupling agents, is introduced into the axial region of the mixing chamber.

Generally, the formulation material, which includes the polyisocyanate should not include water or other material containing active hydrogen, and, hence, reactive with isocyanate, unless the isocyanate is present in the "blocked" form described above.

As noted, the polyol reactant as such or in the form of a "prepolymer" reaction product with polyisocyanate is introduced into the mixing zone by an inlet port discharging into the peripheral region of the mixing zone, and the other stream of formulation material containing the polyisocyanate where the "single shot" method is used or catalyst-containing mixture where the "prepolymer" method is used, is charged into the mixing zone by an inlet port communicating with an annular space surrounding the rotating shaft carrying the rotor discs which upon rotation produce the aforementioned shearing forces, both inlets being disposed below the single bearing for the rotating shaft. In this way the formation of resinous or rubbery reaction products, in the bearing which might cause fouling of the bearing, is prevented.

In another modification the mixing chamber has two inlet ports discharging into a peripheral region, one for polyol-containing formulation and the other for polyisocyanate-containing formulation; and a third inlet port discharging into the axial portion for the catalyst-containing formulation previously described.

To obtain uniform and homogeneous mixtures of polyurethane foam formulation materials according to the process of the present invention, which is particularly adapted to process viscous materials within the limits of very short maximum permissible residence times, it is important that the shearing force shall be developed between opposed rotor and stator surfaces having a clearance therebetween of less than ½ inch and preferably between $\frac{1}{16}$ inch and ¼ inch. The lower the clearance distance in a given apparatus, the better will be mixing but the greater will be the back pressure on the pumps charging formulation materials to the inlet ports of the mixing chamber. Preferably, the back pressure on the pumps should be below 200 pounds per square inch. Rotors may be rotated at peripheral speeds ranging from 10 to 200 feet per second.

The maximum obtainable throughput rates of formulation materials in the mixing apparatus depends on (1) the minimum permissible residence time which is determined by the reactivity of the reactants and activity of the catalyst in the formulation, (2) the number of stages in the mixing chamber, (3) the volumetric capacity of each stage, (4) and the limits of internal pressure that the mixing chamber will stand or the limits of forward pressure that the pumps will deliver. The minimum permissible residence time for foam formulations may vary from ½ second to 25 seconds; for many commercially important formulations it is between 0.8 second and 2 seconds.

For the mixing apparatus described below, having an internal diameter of 2 inches, and a clearance of $\frac{3}{16}$ inch between rotor and stator surfaces the optimum operating conditions for the reactive foam formulations described in Example I are as follows: rotor speed, 5000 r.p.m.=35 feet per second at the periphery of the rotor disc, residence time, 1.1 seconds, throughput rate 7 lbs./minute.

The interior of the mixer is cylindrical and the rotor discs and baffles are arranged therein, as noted with the peripheries of the discs, which may be serrated or notched, if desired, generally concentric with the circle defining the cross-section of the cylinder. Similarly the baffles are annular and positioned with their axes in alignment with the axes of the rotor shaft and that of the mixing chamber. In this way "dead" or inactive spaces and bypassing of the reaction mixture in its flow through the mixer is avoided.

In the accompanying drawings, forming a part of this specification and showing, for purposes of exemplification, a preferred form of apparatus, which represents one of many different apparatuses which may be used in practicing the process of this invention, without limiting the claimed invention to the illustrated apparatus:

FIGURE 1 is a perspective view, certain of the parts being broken away to enable the showing of the general organization of parts;

FIGURE 2 is a vertical section partly in elevation on a greatly enlarged scale, as compared with the scale of FIGURE 1, showing one form of mixing chamber; FIGURE 2 shows the actual size of the mixing chamber, i.e., it is approximately to scale; and FIGURE 3 is a wiring diagram showing the more important electrical switches and relays controlling the operation of the parts of the apparatus shown in the drawings.

Referring to FIGURE 1 of the drawing, 10 is a reservoir tank for the polyisocyanate formulation mixture, 11 is a reservoir tank for the polyol formulation mixture, and 12 is a reservoir tank for the solvent which may be any solvent which readily dissolves the reactants, as well as rubbery reaction products formed. Examples of such solvents are acetone, methyl ethyl ketone and trichloroethylene. Each of these tanks 10, 11 and 12 is provided with a pump 13 individual thereto and disposed in the discharge line leading therefrom, which pump desirably is driven by an electric motor (not shown). Line 14 leads from tank 10, line 15 from tank 11, and 16 from tank 12. These lines communicate with flexible lines 17, 18 and 19, respectively, leading to a mixer 20 which will be described in detail hereinafter.

Mixer 20 is mounted on the reciprocating carriage 21, which is provided with wheels 22 traveling on rails 23, supported on a suitable framework 24. Reciprocation of carriage 21 is effected by a piston rod 25 connected to one end of the carriage, as at 26, and actuated by piston cylinder 27 having a piston 28 therein. Cylinder 27 is supplied with actuating fluid, such as compressed air, through lines 29 and 31, flow through which is controlled by a 4-way valve 32. This valve 32 has a rotating stem 33 therein, which in one position causes the pressure fluid to be supplied to the cylinder 27 to move the piston 28 from right to left viewing FIGURE 1, and in the other operative position supplies the pressure fluid to the other side of piston 28, so that it moves from left to right viewing FIGURE 1. The position of valve stem 33 is controlled by a double solenoid 34, which through link 35 effects rotary movement of the valve stem 33.

Solenoid 34 is in circuit with two limit switches LS1 and LS2 which may be of any well known type and are actuated by a laterally projecting bar or switch actuating arm 38 on the carriage 21. Thus, when the carriage 21 is moved towards the left viewing FIGURE 1, bar 38 engages the limit switch LS1, closing this switch and energizing one coil of the double solenoid 34 to move the valve stem 33 to supply pressure fluid to the cylinder 27 and thus effect movement of the carriage 21 from left to right viewing FIGURE 1. On the return stroke, when the laterally projecting bar 38 engages the limit switch LS2, the other coil of double solenoid 34 is energized to move the valve stem 33 so as to supply pressure fluid to the cylinder 27 to cause it to move the carriage 21 from right to left. Thus in normal operation the carriage reciprocates back and forth across the width of conveyor 39 under the control of the limit switches LS1 and LS2.

Conveyor 39 may be in the form of a conveyor belt mounted so that the upper run 41 is disposed below the discharge port of the mixer 20. Mold pans 42 or other receivers for the polyurethane forming mix may be carried by the conveyor into position to receive the reaction mix from the mixer 20, as shown in FIGURE 1 and thence to a collecting area. Movement of the conveyor, which may be driven by a suitable motor is synchronized with that of the reciprocating carriage 21 carrying the mixer 20 so that a layer of formulation mix of uniform thickness is formed across the full width of the mold pan 42, as the latter is moved by the conveyor beneath the discharge port of the mixer.

A third limit switch LS3 is positioned to the rear of limit switch LS2. Limit switch LS3, when actuated, controls the operation of 3-way valve 43 which is actuated by a double solenoid 44 similar to solenoid 34. Solenoid 44 is in circuit with limit switch LS3 and actuates when energized, through link 45 the valve stem 46 of valve 43. In circuit with solenoid 44 is the flush button switch 47 (FIGURE 3) which is closed when flush button 48 on control panel 49 is actuated.

Carriage 21 is provided with lines 51, 52, 53 with which the flexible lines 17, 19 and 18 respectively, communicate. Line 51, the polyol formulation mixture line, communicates with a three-way valve 54 which controls flow therethrough. Operation of valve 54 is effected by a diaphragm motor 55, flow of pressure fluid to which is controlled by three-way valve 43. Line 52, the solvent line, is provided with branches 56, 57. Branch 56 leads to the 3-way valve 54 from which a line 58′ (FIGURE 2) leads to the peripheral region of the mixer 20. In one operative position of three-way valve 54, polyol formulation mixture flows therethrough to the mixer 20, and in a second operative position, solvent flows therethrough to the mixer 20.

Line 53 leads to a three-way valve 58 operated by a diaphragm motor 59. Branch 57 of the solvent line also leads to this valve 58. A conduit 61 (FIGURE 2) leads from valve 58 to the axial region of the inlet end of the mixer 20. In one operative position of valve 58, polyisocyanate formulation mixture flows to the mixer 20, and in a second operative position solvent flows to the mixer.

One coil of solenoid 44 is in circuit with limit switch LS3 so that when this limit switch is energized by switch actuating arm 38, three-way valve 43 is moved to supply pressure fluid to diaphragm motors 55 and 59 to position the three-way valves 54 and 58 to open the solvent lines to the mixer 20 and close the polyol and polyisocyanate formulation mixture lines to the mixer. The other coil of solenoid 44 is in circuit with the starter switch 62 and run switch 63 controlled by starter button 64 and run button 65 on control panel 49. When either the starter switch 62 or run switch 63 is closed, valve 43 is actuated to effect operation of three-way valves 54 and 58 to open the polyol and polyisocyanate formulation mixture lines leading to the mixer and close the solvent branch lines 56 and 57.

Limit switch LS2 is in circuit with flush switch 47 controlled by flush button 48. When switch 47 is actuated by button 48 a switch in circuit with LS2 is opened rendering limit switch LS2 inoperative to effect right to left movement of carriage 21 viewing FIGURE 1. Accordingly the carriage continues its movement to the right, arm 38 riding over limit switch LS2 and engaging limit switch LS3 and thus energizing solenoid 44, as above described, to move three-way valves 54 and 58 to open the solvent branch lines 56 and 57 and close the lines 51 and 53.

A slop funnel 66 having a laterally extending lip 67 is mounted on the framework of the machine for back and forth movement from the position shown in FIGURE 1 where the lip 67 extends over the side 68 of mold pan 42 to a position spaced from side 68. In the position shown in FIGURE 1 slop funnel is disposed to receive reactants and solvent mixture discharged from the mixer 20, when the latter is at the extreme right hand end, viewing FIGURE 1, of its path of travel. This is the position of the mixer 20 when starting up the machine and when limit switch LS3 is actuated to effect, as hereinabove described, flow of solvent to the mixer 20. Slop funnel 66 discharges into a suitable receiver 69 positioned to receive the material discharged therethrough.

Funnel 66 is reciprocated by a fluid pressure, preferably air, cylinder 71 having its position stem fastened to funnel 66 as at 73. Flow of pressure fluid to cylinder 71 to effect movement of funnel 66 from its material receiving position shown to a position spaced from conveyor 39 and back when desired, is controlled by a four-way valve 74, actuated through link 75 by a double solenoid 76. One coil of solenoid 76 is in circuit with the switch 47 actuated by flush button 48 so that when this switch is closed, the solenoid is energized to move four-way valve 74 to actuate cylinder 71 to move funnel 66 to the position shown in FIGURE 1 to receive the solvent mixture discharged from mixer 20. The other coil of solenoid 76 is in circuit with the switch 63 actuated by run button 65 so that when this switch is closed, the other coil of solenoid 76 is energized to actuate cylinder 71 to return the funnel 66 to a position spaced from conveyor 39. As will be explained more fully hereinafter, when run button 65 is actuated, the apparatus functions to supply polyol and polyisocyanate reaction mixtures continuously to mixer 20, which discharges the highly dispersed reaction mix back and forth into the mold pan 42 as this pan is moved by conveyor 39 in a direction at right angles to the direction of reciprocation of carriage 21.

Carriage 21 has mounted thereon a motor 77 provided with a speed regulator 78 of any conventional type. Motor 77 drives rotor shaft 79 (FIGURES 1 and 2) which extends axially through the mixer, as clearly shown in FIGURE 2. Rotor shaft 79 is journaled in a self-lubricating bearing 80 mounted on top 81 of the mixer housing and sealed by means of packing 82 and a packing gland 83, which is secured by packing nut 84. The top of the mixer housing, which desirably is in the form of a separate plate, is provided with an inlet port 85 which communicates with an annular space 86 surrounding the rotor shaft 79. The polyisocyanate formulation mixture thus entering port 85 passes through annular space 86 surrounding the rotor shaft 79, resulting in a constant sweep away from the bearing and packing thereabove. This prevents the reactants or reaction product from depositing resinous or rubbery matter in the bearing or packing. Inlet port 85 is in general used to convey that reactant which is potentially least harmful to the bearing or packing, i.e., the reactant which is less viscous, rubbery, or corrosive. As indicated, it is preferred to introduce the polyisocyanate formulation mixture through inlet port 85.

Top plate 81 of the housing is also provided with one or more inlet ports 87 which discharge into the peripheral region of the upper portion of the mixing chamber. As disclosed above, solvent is supplied to ports 85 and 87 when the valves controlling flow of solvent are actuated to permit such flow to take place to the mixer 20.

Mounted for rotation with the rotor shaft 79 in equi-spaced relation to each other are the rotor discs 88, 89 and 91. These discs are separated by collars 92. They extend from the rotor shaft toward the outer periphery of the reaction zone, i.e., towards the inner side wall 93. Between the rotor discs 88 and 89 is an annular baffle 94, which extends from the inner wall towards the rotor shaft, leaving an annular space 95 for flow of reaction mixture therethrough. A similar baffle 96 is positioned mid way between the rotor discs 89 and 91 extending from the outer periphery of the reaction zone toward the axial portion of the zone and terminating short of collar 92 forming an annular flow channel 97 through which the reaction mixture passes. A discharge conduit 98 leads from the dished base 99 of the mixing chamber. Baffle 94 is spaced mid way between rotor discs 88 and 89 and baffle 96 mid way between rotor discs 89 and 91. The parts are so dimensioned and spaced that a sinusoidal path of flow is provided through the mixer which is of equal depth or transverse extent throughout its full length.

The assembly of top plate 81, sides containing the baffles 94 and 96 and base plate 101 are bolted together by bolts 102 having nuts 103 thereon for ease of manufacture and assembly. Mixers of the type shown in FIGURE 2 may, of course, be constructed and assembled in various ways. Thus elements of the mixing chamber-baffle assembly may be nested and bolted together as shown, or may be secured to each other by screw threads. Likewise the individual elements in the rotor disc-rotor shaft assembly may be secured to each other by screw threads; in the construction shown in FIGURE 2, it suffices if the lowermost rotor disc (91) is secured to the end of the rotor shaft (79) by screw threads. If desired, the collar elements 92 may be made integral with rotor discs 89 and 91.

While in the apparatus shown on the drawings, a mixing chamber having three rotor discs and two cooperating baffles has been shown, it will be understood that by extending the length of the rotor shaft one or more additional rotor discs and cooperating annular baffle units may be employed to increase the capacity of the mixer.

In the operation of the mixer disclosed, reaction mixture passing therethrough is subjected to the action of shearing forces which have a minimum value when the material is in the axial region of the mixer, which shearing forces increase continuously as the material flows outwardly toward the peripheral region, because the linear speed of the rotor discs 88, 89 and 91 increases as the radial distance increases and reaches a maximum at the circumference of these discs. These forces decrease as the reaction mix flows back toward the axial region between each rotor disc and its baffle. The action above described takes place repeatedly, first as the reactants flow over and under rapidly rotating rotor disc 88, secondly as the resultant reaction mixture flows over and under rapidly rotating rotor disc 89 and thirdly as flow takes place over and under rapidly rotating rotor disc 91. The reaction mix uniformly and intimately dispersed leaves the mixing chamber 20 through discharge conduit 98.

Flow through the mixer is sufficiently uniform to prevent resinous or rubbery reaction products from forming or accumulating in the mixer. As noted, the fouling of the bearing in which the rotor shaft 79 is mounted for rotation by resinous, rubbery, or corrosive matter is prevented, because the rotor shaft, in the apparatus shown in the drawings, is journaled in only one bearing, which bearing is protected by the continuous flow through the annular inlet port 86 surrounding the rotor shaft, of a stream of the charge material which is itself innocuous to the bearing and which exerts a flushing action away from the bearing. The material which is viscous, resinous, corrosive, etc. is charged to the peripheral region of the upper portion of the mixing chamber where it mixes with the stream of reactant introduced through the annular port 86 and the resultant mixture flows in a sinusoidal path first over the rapidly rotating rotor disc 88, then beneath this disc, etc.

FIGURE 3 is a wiring diagram of the important electrically actuated parts of the apparatus. Conventional relays which insure that a complete cycle is performed have been omitted in the interests of simplicity. For example, the relay, which insures that the stop button 105 on the control panel 49 (FIGURE 1) is actuated before actuation of start button 64 or run button 65 can be effective to cause operation of the parts controlled thereby, has been omitted. As explained more fully hereinafter, start button 64 when actuated positions carriage 21 and slop funnel 66 in proper position for starting operations.

In FIGURE 3, 106 is a stop switch which is normally closed. When this switch is opened power is completely interrupted and all moving parts stop. Branch line 107 has therein the switch 62 closed by start button 64 on control panel. In circuit with this switch is the relay R1. When this relay is energized, the following switches in the parallel branch lines indicated are closed.

(1) R1a in branch line 111 which energizes the motors 13′ driving the material pumps 13 (FIGURE 1).

(2) R1b in line 112 which starts the mixer motor 77.

(3) R1c in line 113 which energizes solenoid 44 to actuate valve 43 which in turn actuates the diaphragm motors 55 and 59 to position three-way valves 54 and 58 to permit flow of polyol and polyisocyanate formulation mixtures to the mixer 20.

(4) R1d in line 114 which energizes solenoid 76 to actuate four-way valve 74 to admit pressure fluid to cylinder 71 to position the slop funnel 66 in the position shown in FIGURE 1.

(5) R1e in branch line 115 which energizes solenoid 34 to effect movement of carriage 21 to the extreme right (viewing FIGURE 1).

When switch 63 in branch line 108 is closed by actuation of run button 65, energizing relay R2, the following switches in the parallel branch lines indicated are closed:

(1) R2a in branch line 117 which energizes solenoid 76 to effect withdrawal of slop funnel 66 to a position away from conveyor 39.

(2) R2b in branch line 116 which energizes the motor CM which drives the conveyor 39.

(3) R2d in branch line 118 which energizes solenoid 34 operating valve 32 to start carriage 21 moving from right to left viewing FIGURE 1. Once movement of the carriage commences it moves back and forth controlled by limit switches LS1 in line 115 and LS2 in line 118. These limit switches when closed, energize the respective coils of solenoid 34.

In addition, relay R2 effects opening of switch R2e in branch line 119 which prevents start of the solvent pump 13.

When switch 47 in branch line 109 is closed by flush button 48, relay R3 is energized closing the following switches:

R3a in branch line 114 which energizes solenoid 76 and effects movement of slop receiving funnel 66 to the position shown on FIGURE 1.

R3b in branch line 115 which energizes solenoid 34 and effects movement of carriage 21 to the extreme right hand position viewing FIGURE 1.

In addition the relay R3 opens a switch R3d in branch line 111 to stop the polyol and polyisocyanate formulation mixture pumps and a switch R3e in branch line 118 to render limit switch LS2 ineffective to cause return movement of carriage 21. Accordingly, this carriage in its movement to the right actuates limit switch LS3 in branch line 119 which energizes solenoid 44 to actuate valve 43 and to start solvent pump SP. Diaphragm motors 55 and 59 are thus actuated to close the polyol and polyisocyanate formulation mixture lines and open the solvent lines to the mixer.

Closing of switch 120 by stop button 105 energizes relay R4 which effects opening of (1) switch R4a stopping mixer motor 77, (2) switch R4b which stops the conveyor motor CM, and (3) switch R4c which effects stopping of the solvent pump.

In operation with the polyol, polyisocyanate formulation mixtures in their respective tanks, upon pressing the start button 64, the mixer motor 77 is started, the polyol and polyisocyanate formulation mixture pumps but not the solvent pump are driven, carriage 21 is moved to the extreme right viewing FIGURE 1 and the slop funnel 66 is in the position shown in FIGURE 1. The reactants are passed through the mixer for a few seconds to permit the formation of a uniform, intimately dispersed reaction mix. During these few seconds, the reaction mix is discharged into the slop funnel and thence into receiver 69.

When the reaction mix is uniform, run button 65 is actuated. This starts the conveyor 39, the traversing back and forth of carriage 21, and the movement of funnel 66 back to its original position spaced from conveyor 39. A uniform mix is continuously delivered to the mold pan 42 forming a uniform layer therein.

Should it be desired to interrupt the machine for any reason, say to change the mold pan 42, flush button 48 is actuated. This stops the reactant feed pumps 13, returns the carriage to a position at the extreme right of its path of travel viewing FIGURE 1, actuates limit switch LS3 to open solvent line and close the reactant feed lines, starts the solvent pump and positions the slop receiving funnel 66 to receive the solvent mixture which flows from the funnel into the receiver 69.

After flushing the mixer for a few seconds or longer if desired the stop button 105 is actuated. This, as above explained, stops the mixer motor 77, the conveyor motor which drives the conveyor 39 and the solvent pump 13.

The above-described control system includes both electrical and pneumatic elements. Other control systems arranged to function in the same manner, incorporating control elements of electrical, mechanical, pneumatic or hydraulic character, or any combination thereof, could, of course, be substituted.

The invention is further illustrated, but not limited, by the following examples. These examples were carried out in the apparatus shown in the drawings hereinabove described. The mixer 20 had the following dimensions:

| | |
|---|---|
| Capacity (void space)_____cu. in__ | 3.1 |
| Rotor shaft, diam_____in__ | 5/8 |
| Mixing chamber, diam_____in__ | 2 |
| Baffle annulus, diam_____in__ | 1 |
| Baffle thickness_____in__ | 1/4 |
| Rotor disc, diam_____in__ | 1 5/8 |
| Rotor disc, thickness_____in__ | 1/8 |
| Clearance between rotor disc and baffle surfaces_in__ | 3/16 |
| Inlet port 85, diam_____in__ | 1/8 |
| Inlet port 87, diam_____in__ | 1/4 |

The rotor shaft was made of steel, the shell members of aluminum, and the rotor discs and spacers of brass.

EXAMPLE I

*Continuous Preparation of a Low-Density Flexible Polyurethane Foam by the "Single-Shot" Procedure*

In this "single shot" procedure for making polyurethane foams, a polyisocyanate is added to a preformed mixture containing polyol, water, catalyst, emulsifier and, if desired, colorant.

The polyisocyanate used in this example was a mixture of meta tolylene diisocyanates containing 80% of the 2,4 isomer and 20% of the 2,6 isomer.

The polyol used in this example was a high molecular weight polyester containing free hydroxyl groups in terminal positions and elsewhere. It was prepared by copolymerizing adipic acid with a mixture of a major proportion of a glycol and a minor proportion of a triol. It had an acid number of about 1, a hydroxyl number of about 60, an average equivalent weight of about 920, and a Brookfield viscosity of about 9,000 cps. at 25° C.

The emulsifier used in this example, "Emulphor EL–719" (General Aniline & Film Corp.), was a polyethylene glycol ricinoleate.

The colorant used in this example was a copper phthalocyanine filter cake, prepared by the "acid-pasting" procedure, which contained about 12% pigment and about 88% water.

Tank 11 was charged with a formulation mixture (premix) as follows:

| | Parts |
|---|---|
| Polyester polyol _____ | 1000 |
| Dispersing agent _____ | 42 |
| N-methyl morpholine (catalyst) _____ | 25 |
| Blue Pigment (100% basis) _____ | 1 |
| Water in pigment filter cake _____ | 7 |
| Additional water _____ | 53 |
| Total _____ | 1128 |

Tank 10 was charged with 450 parts of meta tolylene diisocyanate mixture. Tank 12 was charged with acetone.

The mixing head was started at a speed of 4000 r.p.m. The gear pumps 13 were started at rates to provide deliveries of about 2250 grams/minute of premix and 900 grams/minute of tolylene diisocyanate mixture. Back pressures on the gear pumps were about 60 p.s.i. Residence time of reactant in the mixer 20 was about 1 second.

After the reaction mixture started discharging from the mixer 20 the reciprocating carriage 21 and the conveyor belt 39 were set in motion. Several pans of foam were collected. At the end of the run flush button 48 was actuated, flushing the mixer with acetone to clean it.

The layers of reaction mixture on the bottom of the mold pans started to expand soon after being laid down. The volume increased about 46 fold after about one minute at which time the temperature had risen to about 80° C. The blocks of foam were allowed to cure in the open for at least 10 minutes before being removed from the pans. The foam blocks were then heated at 250° F. in a forced draft oven for 3 hours to complete the cure.

The cured foam was colored an attractive blue shade of medium depth. It was substantially uniform as to color, texture, pore size and pore distribution. Its physical properties were approximately as follows:

| | |
|---|---|
| Density _____ | 1.6 lbs./cu. ft. |
| Tensile strength _____ | 19 p.s.i. |
| Compression set _____ | 10%. |
| Resilience _____ | 25%. |
| Elongation _____ | 400%. |

EXAMPLE II

*Continuous Preparation of a Low Density Flexible Polyurethane Foam by the "Prepolymer" Procedure*

In the "prepolymer" procedure for making polyurethane foams, the polyisocyanate and polyol components are premixed and partially reacted to form a "prepolymer" which is thereafter mixed with a "catalyst mixture" containing water, catalyst, emulsifier, and, if desired, colorant.

The polyol used in this example was a polymer of adipic acid and diethylene glycol having approximately the following characteristics: acid No. 2; hydroxyl No. 62; average molecular weight 1750. The polyisocyanate used in this example was the same as that used in Example I.

The emulsifier used in this example was "Witco 77–46" (Witco Chemical Co.).

The colorant used in this example was a pigment filter cake containing 78% of water and 22% of precipitated coupling product of one mol of tetrazotised dichlorodianisidine with two mols of aceto acet-1,2,4-xylidide.

The "prepolymer" reactant mixture was prepared by rapidly charging 390 parts of the tolylene diisocyanate mixture to 1000 parts of the diethylene glycol adipate polyester, covering the mixture with carbon dioxide gas to exclude atmospheric moisture, and agitating it for 30 minutes during which the temperature rose to 30 to 35° C. In accordance with preferred practice, the prepolymer was used as soon as possible after preparation in order to minimize viscosity increases resulting from gelling.

The "catalyst mixture" was prepared from the following components.

| Component: | Parts |
|---|---|
| N-methylmorpholine (catalyst) _____ | 27 |
| Emulsifier _____ | 20 |
| Pigment (100% basis) _____ | 1 |
| Water in pigment filter cake _____ | 3.6 |
| Additional water _____ | 46.4 |
| Total _____ | 98.0 |

The "prepolymer" was charged to the mixing head via inlet port 87 at a rate of about 2840 grams per minute. The "catalyst mixture" was charged to the mixing head via inlet port 85 at a rate of about 200 grams per minute. The operating conditions and procedures were about the same as described in Example I except that volume expansion during foaming was about 35 fold.

The resulting foam was of uniform texture and color and was colored an attractive greenish yellow hue of medium depth. It had approximately the following physical properties:

| | |
|---|---|
| Density _____ | 2.1 lbs./cu. ft. |
| Tensile strength _____ | 25 p.s.i. |
| Compression set _____ | 10%. |
| Resilience _____ | 22%. |
| Elongation _____ | 450%. |

While the above examples describe the production of polyurethane foams, it will be appreciated that by using formulations similar to the above except that water or constituents containing carboxyl groups are omitted, homogeneous polyurethane plastics are produced. Continuous sheets or slabs of porous or homogeneous polyurethane plastics may be prepared by discharging the mixture onto a conveyor belt, moving between confining walls, and which passes through a heated tunnel where curing of the polymer takes place.

Instead of the mixer 20 charging into the mold pans 42, it may discharge into molds carried on a turntable, to produce molded or cast articles. The mixer may discharge into a screw conveyor which forces the reaction mix through a suitable die to produce extruded articles.

It will be noted the present invention provides processes for mixing materials having a short pot life, several minutes or less, and which tend to form solid masses, to produce substantially continuously, a reaction mix in which the reactants are uniformly and intimately mixed. In that the process provides for prompt and efficient flushing of the mixer immediately after interruption of flow of reactants takes place, it prevents fouling and/or gumming of the mixing chamber. Moreover, the introduction of the reactants so that those tending to form gummy masses are introduced into the peripheral region of the mixing zone into admixture with a second stream of reactants flowing from the axial region at the inlet end of the mixing zone toward the peripheral region (which second stream contains the constituents which are not harmful or least harmful to the bearing or packing, i.e., the reactants which are least viscous, resinous or corrosive) prevents fouling of the bearing for the rotor shaft.

While the invention has been chiefly described in connection with the production of polyurethane plastics, it will be understood, it is not limited thereto but includes processes for mixing components to produce an intimately dispersed reaction mix, which components have a short pot life, several minutes or less, and tend to react readily to produce solid masses. Other examples of such reaction mixes are epoxy resin formulations. When producing epoxy resin forming mixes, the resin forming reactants are introduced as a continuous stream in the peripheral region of the inlet end of the mixer into admixture with a stream of the activator constituents introduced in the axial region of the inlet end of the mixer.

This invention accordingly comprises the several steps and the relation of one or more of such steps with respect to each of the others, all as exemplified in the preceding detailed disclosure, and the scope of the invention will be indicated in the claims.

What is claimed is:

1. The process of producing a reaction mix for the production of a polyurethane plastic in a generally cylindrical mixing zone having therein rotor discs cooperating with stationary discs, which process comprises, continuously feeding to the axial region at the upper portion of said mixing zone a stream of polyisocyanate formulation mixture and flowing said stream from said axial region toward the periphery of said mixing zone; continuously feeding a stream of polyol formulation mixture initially to the periphery of the upper portion of said mixing zone into admixture with the polyisocyanate formulation mixture flowing therethrough; flowing the resultant mixture through a sinusoidal path defined by said rotor discs and said stationary discs, said path having alternate components extending from the periphery to the axial region of said mixing zone and the other components extending from the axial region to the periphery of said mixing zone, said mixture while flowing through said components which extend from the axial region to the periphery being subjected to gradually increasing planar shearing forces produced by the rotation of said rotor discs cooperating with said stationary discs and the said mixture while flowing through said components which extend from the periphery to the axial region of said mixing zone being subjected to planar shearing forces of gradually decreasing intensity produced by the rotation of said rotor discs cooperating with said stationary discs, to produce a reaction mixture in which the constituents are uniformly and intimately mixed; and continuously discharging the reaction mix from the lower portion of said mixing zone.

2. The process as defined in claim 1, in which upon interruption of the feed of the polyol and polyisocyanate formulation mixtures the mixing zone immediately thereafter is flushed throughout its full extent with a solvent for the polyol, polyisocyanate and polyurethane plastic.

3. The process as defined in claim 1, in which said planar forces are applied substantially at right angles to the axis of said sinusoidal path of flow.

4. The process as defined in claim 1, in which the stream of polyol formulation mixture contains a catalyst for the polyurethane-forming reaction between the polyol and polyisocyanate.

5. The process as defined in claim 1, in which three separate streams are charged to the upper portion of the mixing zone, one the stream of polyisocyanate formulation mixture, the second the stream of polyol formulation mixture, and the third a catalyst capable of promoting the polyurethane-forming reaction between the polyol and polyisocyanate.

References Cited in the file of this patent

UNITED STATES PATENTS

| | | |
|---|---|---|
| 1,208,534 | Foret | Dec. 12, 1916 |
| 1,670,593 | Miller | May 22, 1928 |
| 1,845,128 | Coahran | Feb. 16, 1932 |
| 2,460,987 | Kranhofer | Feb. 8, 1949 |
| 2,601,674 | Reman | June 24, 1952 |
| 2,630,302 | Jones | Mar. 3, 1953 |
| 2,706,108 | Miner | Apr. 12, 1955 |
| 2,764,565 | Hoppe et al. | Sept. 25, 1956 |
| 2,774,654 | Reed | Dec. 18, 1956 |
| 2,777,831 | Seeger et al. | Jan. 15, 1957 |
| 2,788,337 | Preiswerk et al. | Apr. 9, 1957 |
| 2,814,827 | Snow et al. | Dec. 3, 1957 |
| 2,847,196 | Franklin et al. | Aug. 12, 1958 |
| 2,857,144 | Gurley et al. | Oct. 21, 1958 |
| 3,076,791 | Hollyday | Feb. 5, 1963 |

FOREIGN PATENTS

| | | |
|---|---|---|
| 298,619 | Germany | June 20, 1917 |
| 545,744 | Belgium | Sept. 3, 1956 |

UNITED STATES PATENT OFFICE
CERTIFICATE OF CORRECTION

Patent No. 3,141,865　　　　　　　　　　　　　　　　　　July 21, 1964

Richard T. McEvoy

It is hereby certified that error appears in the above numbered patent requiring correction and that the said Letters Patent should read as corrected below.

Column 3, line 70, for "production" read -- proportion --; column 7, line 60, for "position" read -- piston --.

Signed and sealed this 17th day of November 1964.

(SEAL)
Attest:

ERNEST W. SWIDER
Attesting Officer

EDWARD J. BRENNER
Commissioner of Patents